United States Patent
Becker et al.

[15] 3,674,978
[45] July 4, 1972

[54] TORCH, ESPECIALLY FOR PLASMA CUTTING

[72] Inventors: Werner Becker, Frankfurt am Main; Alfward Farwer, Kelkheim; Georg Frank, Langen; Bernhard Reis, Frankfurt am Main; Josef Rohf, Frankfurt am Main; Rupert Auer, Frankfurt am Main, all of Germany

[73] Assignee: Messer Griesheim GmbH, Frankfurt/Main, Germany

[22] Filed: April 23, 1971

[21] Appl. No.: 136,883

[30] Foreign Application Priority Data
April 24, 1970 Germany.....................P 20 19 946.6

[52] U.S. Cl..............................219/121 P, 219/75, 313/231
[51] Int. Cl...........................................................B23k 9/00
[58] Field of Search ....................219/121 P, 75, 76; 313/231

[56] References Cited
UNITED STATES PATENTS

| | | | |
|---|---|---|---|
| 3,562,486 | 2/1971 | Hatch et al. | 219/121 P |
| 3,375,392 | 3/1968 | Buzozowski | 219/121 P X |
| 2,960,594 | 11/1960 | Thorpe | 219/121 P X |
| 2,858,412 | 10/1958 | Kane et al. | 219/121 P |

*Primary Examiner*—R. F. Staubly
*Assistant Examiner*—B. A. Reynolds
*Attorney*—Ernest F. Marmorek

[57] ABSTRACT

Disclosed is a plasma cutting torch comprising an electrode holder, an intermediate insulating piece and a nozzle holder with a nozzle inset. The parts are coaxially arranged and connected by axial fastening means. The insulating piece has a central passage into which centering plugs of the electrode holder and of the nozzle holder are inserted. A central through bore in the electrode holder holds an electrode extending through a ceramic cartridge into the interior of the nozzle inlet.

6 Claims, 1 Drawing Figure

PATENTED JUL 4 1972　　　　　　　　　　　　　　3,674,978
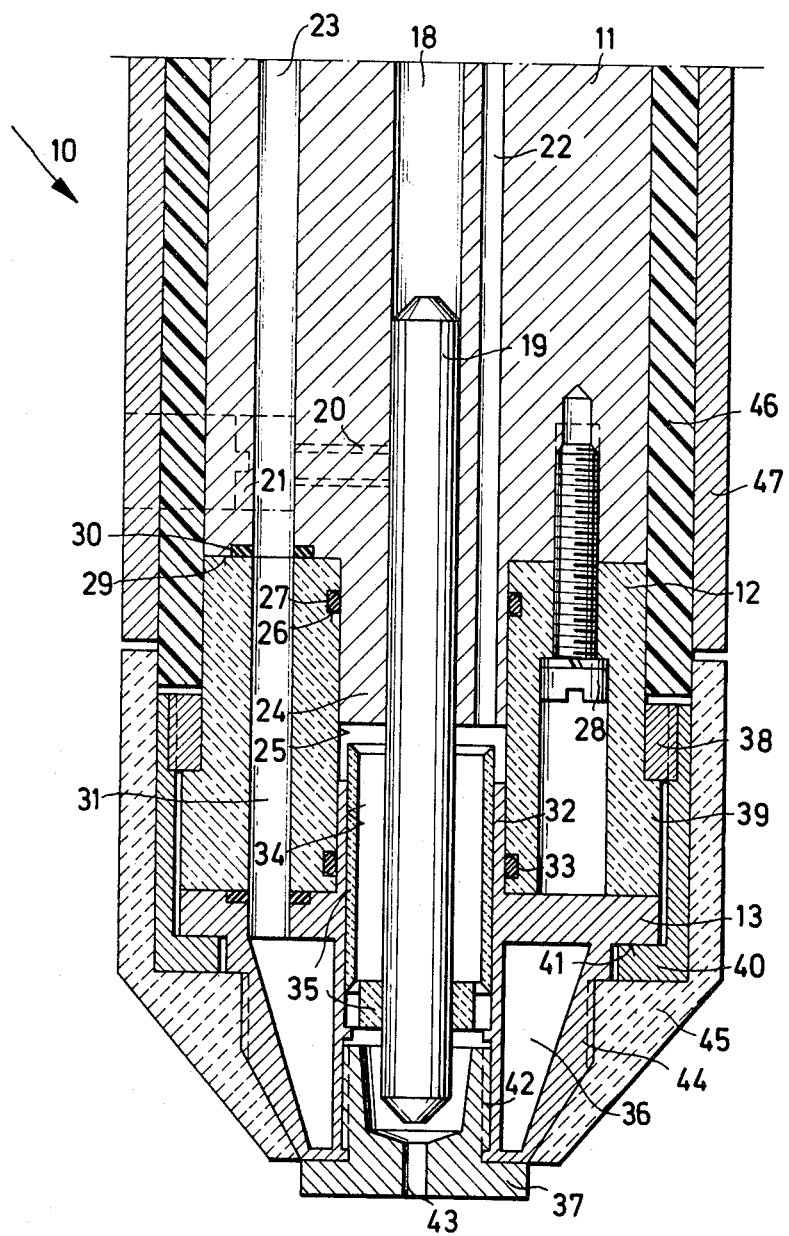
INVENTORS.
WERNER BECKER, ALFRED FARWER,
GEORG FRANK, BERNHARD REIS,
JOSEF ROHE & RUPERT AUER
BY Ernest F. Marmorek
THEIR ATTORNEY

TORCH, ESPECIALLY FOR PLASMA CUTTING

BACKGROUND OF THE INVENTION

This invention relates to a cutting or welding torch and, more particularly, to a plasma cutting and/or welding torch.

Prior art plasma cutting torches have the disadvantage that their construction is complicated and requires a considerable number of parts.

An object of this invention is, therefore, to remove this disadvantage and to provide a plasma cutting torch which is simple in structure and has a minimum amount of components.

SUMMARY OF THE INVENTION

According to the invention, the above object is attained by providing a plasma torch which has the following parts:

a. An electrode holder having a bore for receiving an electrode, channel sections or conduits for gas and cooling fluid passing approximately parallel to the bore, a tapped hole for an electrode fixing screw arranged at an angle to the bore, and a centering plug portion;

b. an insulating piece having a bore for the electrode and a channel for gas, the inside diameter of the bore corresponding to the outside diameter of the centering plug of the electrode holder, channel sections or conduits for a cooling fluid arranged approximately parallel to the through bore and communicating with cooling conduits in the electrode holder;

c. a nozzle holder having a top centering plug portion the outside diameter of which corresponds to the inside diameter of the through bore in the insulating piece, a stepped bore in which a ceramic cartridge for the gas and for the electrode centering is arranged and the lower end of which forms a receptacle for a nozzle inset, an annular chamber communicating with the cooling channels for supplying and discharging the cooling fluid and extending into the range of the nozzle inset.

The above described torch of this invention has an advantage that due to an expedient and simple mutual arrangement of respective parts, the assembly or disassembly of the torch can be achieved in an extremely short time. In addition, the design of the torch parts enables a small size and convenient configuration of the assembled torch.

According to another feature of the proposal of the invention, the fixing screw for the electrodes is accessible from the outside, so that the electrode may be quickly and without difficulties exchanged or adjusted.

BRIEF DESCRIPTION OF THE DRAWING

The invention will now be described in conjunction with the accompanying drawing, the single FIGURE of which is a sectional elevational view of a preferred embodiment of the plasma cutting torch of this invention.

DETAILED DESCRIPTION

The plasma cutting torch 10 according to this invention comprises an electrode holder 11 of copper, an insulating piece 12 and a nozzle holder 13 of brass or copper.

The electrode holder 11 has a central through bore 18 serving for the reception of a tungsten electrode 19. The fixing of the tungsten electrode 19 within the electrode holder 11 is effected by means of an electrode fixing screw 21 and a tapered hole 20 made in the side wall of the holder 11 at an angle to the bore 18. Channel sections 22 and 23 extend parallel to the through bore 18 within the body of the electrode holder 11 to conduct gas or a cooling fluid through the latter.

The bottom portion of the electrode holder 11 is reduced in diameter to form a centering plug 24 which is inserted into a corresponding central boring 25 in the insulating piece 12. The seal between the centering plug 24 and the central boring 25 is made by a sealing ring 27 disposed in an annular recess 26 in the wall of the central boring 25. A positive connection between the insulating piece 11 and the electrode holder 12 is carried out by a fastening screw 28 which is arranged parallel to the through bore 18. To improve the seal of the abutting surfaces 29 between the electrode holder 11 and the insulating piece 12, a sealing ring 30 is disposed around the junction between the channel section 23 in the holder 11 and the channel section 31 passing parallel to the central boring 25 in the insulating piece 12. The aligned channel sections 22 and 23 form a single conduit for the cooling fluid. There are provided similar channels (not shown) for discharging the cooling fluid, as it will be explained below.

The nozzle holder 13 has its top portion reduced in diameter to form a centering plug 32 fitting into the bottom portion of the central boring 25 of the insulating piece 12. A sealing ring 33 disposed in an annular recess in the wall of the central boring 25 provides the seal for the centering plug 32. A stepped through bore 34 passes through the center of the nozzle holder 13. The step in the bore 34 supports a ceramic jacket or cartridge 35 having openings for distributing gas from the channel 22 and for centering the electrode 19. The insulating cartridge 35 serves simultaneously for the protection of the insulating piece 12 and of the nozzle holder 13 against overheating which might result during the torch operation because of the thermal radiation from the hot electrode 19. Furthermore, the cartridge 35 prevents the creation of an electric arc between the electrode 19 and the nozzle holder 13. The lower portion of the nozzle holder 13 is provided with a tapering annular chamber 36 communicating with channels 31 and 23 for supplying and with similar channels (not shown) for discharging the cooling fluid. The chamber 36 surrounds a part of the ceramic cartridge 35 and the nozzle inset 37. The nozzle inset 37 is connected by a thread 42 to the wall of the through bore 34 beneath the supporting step. The nozzle inset 37 is terminated on its tip with an outlet nozzle 43.

The nozzle holder 13 is coupled to the insulating piece 12 by means of a brass box nut 40 which is threaded to the periphery of a threaded brass ring 38. The ring 38 rests on a step 39 of the outside wall of the insulating piece 12 whereas the box nut 40 is held against a shoulder 41 of the nozzle holder 13.

An outer ceramic jacket 45 is fastened by a thread 44 to the outer wall of the nozzle holder 13 to cover both the holder 13 and the box nut 40. The upper part of the insulating piece 12 and the adjoining electrode holder 11 are covered on their peripheries by a tube 46 of plastics which, on its outer wall, is enclosed by a protective metal sheet 47.

The torch 10 of this invention is employed preferably for plasma cutting by means of a transmitted electric arc. In this mode of operation, the electrode 19 is a cathode and the work piece an anode. The torch 10 is also applicable for a non-transmitted electric arc, in which case the nozzle inset 37 serves as an anode. The latter torch arrangement can be used for plasma welding and for fill-up welding, as well as for heating or melting. If the torch 10 is to be modified for welding additional channels for a supplementary gas (protective gas) must be provided in the electrode holder 11, insulating piece 12 and the nozzle holder 13. The ceramic cartridge 35 is accommodated to this additional protective gas channel in such a manner as to produce a uniform, gas envelope surrounding the flame.

The torch of this invention can be employed both for the machine and for the manual plasma welding or cutting.

In addition, the arrangement of this invention may be embodied in various other torch constructions and other specific types such as, for example, WIG, MIG or MAG.

It is intended that the disclosure be illustrative rather than limiting, and that the invention be accorded the full scope of the appended claims.

We claim:

1. A torch, especially a plasma cutting and/or welding torch, comprising
    an electrode holder having a central through bore for receiving an electrode, a plurality of channels arranged beside and substantially parallel to said central bore for conducting working gas and cooling fluid, a lateral tapped hole with an electrode fixing screw arranged at an angle to said central bore, and a centering plug of reduced diameter enclosing lower portions of said central bore and said gas conducting channels;

an insulating piece of annular configuration having a central passage for receiving said centering plug, channels for conducting cooling fluid arranged substantially parallel to said central bore and in alignment with corresponding channels in said electrode holder;

a nozzle holder having a top surface mating with the bottom of said insulating piece, an upwardly directed centering plug fitting into said central passage of said insulating piece, a stepped central boring for receiving an insulating gas distributing cartridge at its upper section and a nozzle inset at its lower section, and an annular chamber surrounding said nozzle inset and a portion of said cartridge and communicating with said cooling fluid channels.

2. A torch according to claim 1, further comprising a tapped hole arranged parallel to said central throughbore in said electrode holder, and a stepped hole arranged in said insulating piece in alignment with said tapped hole for receiving a fastening screw.

3. A torch according to claim 2 wherein said insulating piece and said nozzle holder are clamped together by a box nut.

4. A torch according to claim 1 wherein said protective cartridge is of a ceramic material.

5. A torch according to claim 1 further comprising an outer protective jacket of ceramic material.

6. A torch according to claim 5 wherein said lateral tapped hole in said electrode holder is accessible from the outside.

* * * * *